United States Patent
Fukushima et al.

[11] Patent Number: 5,625,620
[45] Date of Patent: Apr. 29, 1997

[54] OPTICAL DISC

[75] Inventors: Yoshihito Fukushima, Miyagi; Goro Fujita, Kanagawa, both of Japan

[73] Assignee: Sony Corporation, Tokyo, Japan

[21] Appl. No.: 624,646

[22] PCT Filed: Aug. 25, 1995

[86] PCT No.: PCT/JP95/01697
§ 371 Date: Jul. 1, 1996
§ 102(e) Date: Jul. 1, 1996

[87] PCT Pub. No.: WO96/06432
PCT Pub. Date: Feb. 29, 1996

[30] Foreign Application Priority Data

Aug. 25, 1994 [JP] Japan .................................. 6-200874

[51] Int. Cl.⁶ .................................................. G11B 7/00
[52] U.S. Cl. .................................................... 369/275.3
[58] Field of Search ............................. 369/275.1–275.4

[56] References Cited

U.S. PATENT DOCUMENTS

| 5,436,770 | 7/1995 | Muto et al. | 360/51 |
| 5,533,003 | 7/1996 | Kobayashi | 369/275.4 |

Primary Examiner—Nabil Hindi
Attorney, Agent, or Firm—Jay H. Maioli

[57] ABSTRACT

An optical disc has a base formed by resin, and a reflection layer formed on the base. On the base, servo areas where servo pits P1, P2 for providing servo information for sample servo system are formed at predetermined angular positions of respective tracks on the base. Further, data areas where data pits Pd for providing data information accessed by the optical disc drive operative on the basis of the servo pits P1, P2 are formed between the respective servo areas. In addition, in the servo area and the data area which are adjacent to each other, between servo pit P2 disposed at the position closest to the data area and data pit Pd disposed at the position closest to the servo area, anchor pit Pan neglected in the optical disc drive is provided.

4 Claims, 11 Drawing Sheets

OPTICAL DISC

TECHNICAL FIELD

This invention relates to an optical disc in which tracking control, etc. is carried out by the sample servo system.

BACKGROUND ART

Hitherto, an optical disc for carrying out recording/reproduction of information by irradiation of laser beams, magneto-optical discs, various write-once type optical discs which are, digital audio discs so called compact discs, and optical video discs, etc. have been put into practical use.

The compact disc and/or the optical video disc among these optical discs are reproduction only optical discs, are ordinarily of a structure in which a reflection layer is formed on a transparent base (substrate) where data pits corresponding to information signals are formed in a recessed form.

As the transparent base, because cost can beheld down to a lower level particularly in the case where those bases are mass-produced, disc-shaped bases obtained by injection-molding resin such as polycarbonate, etc. are frequently used. Data pits are arranged and formed as a concave recessed form on tracks set in concentrical form or in spiral form of the transparent base.

Moreover, the reflection layer is stacked on the surface where data pits are formed of the transparent base. Aluminum reflection film is generally used because of its high reflection factor and good thermal conductivity.

In the reproduction only optical disc of such a configuration, a technique is employed to detect a difference between quantity of reflected light at the pit portion and that at the portion where no pit exist, i.e., the mirror portion when laser beams are irradiated from the transparent base side to reproduce the pit pattern on the tracks on the basis of the difference. In this case, in order to carry out precise signal reproduction free from error by such a technique, it is necessary that a laser beam spot is precisely irradiated onto the track where a pit pattern to be read out is formed. For this reason, in the optical disc drive, tracking servo of the optical pick-up is carried out.

As the optical disc system for scanning, by laser beams, tracks formed in a concentric form or in a spiral form to carry out recording/reproduction of various data, there are known the optical disc system of the CLV system for rotationally driving the optical disc at a constant linear velocity (CLV) to carry out recording/reproduction of data, and the optical disc system of the CAV system for rotationally driving the optical disc at a constant angular velocity (CAV) to carry out recording/reproduction of data.

Further, there are known, in terms of the servo system, optical discs of the continuous servo system to carry out tracking control, etc. by using pre-grooves continuously provided along the tracks, and optical discs of the sample servo system to carry out tracking control, etc. by making use of servo areas discretely provided on the tracks.

In the case of the optical discs of the sample servo system, respective tracks are divided into plural data areas, and two servo pits are respectively formed in the servo areas between the respective adjacent two data areas.

Respective two servo pits are formed as so called wobble pits by a geometrical concavity at positions respectively spaced by a ¼ track width in a radial direction from a center line of the track by arrangement in wobble form in such a manner that the scanning line of the laser beam spot, i.e., the center line of the track is put therebetween before and after.

Tracking servo of the laser spot is carried out on the basis of servo pits arranged in a wobble form. Such servo pits are used for tracking servo as stated above, and are also utilized for generating a clock signal for the reproducing system. Accordingly, in the sample servo system, shape and/or position accuracy of the servo pit are very important for satisfactorily constituting the reproducing system.

Meanwhile, as the transparent base (substrate) of the optical disc, injection-molded bases are frequently used as described above. Such injection-molded base is made up, e.g., in a manner as described below.

Namely, a stamper where the inversion pattern of data pits and servo pits is formed is fixed within a metal mold to carry out mold-clamping to inject resin such as molten polycarbonate, etc. into the metal mold in which the stamper is fixed. Then, pressure is applied to the metal mold while cooling it. After the resin is solidified, the metal mold is opened to peel (separate) the resin from the stamper. Thus, an injection-molded base for an optical disc on which the inversion pattern of the stamper has been transferred is obtained.

In this case, transfer failure (or unsatisfactory transfer) of pits resulting from thermal contraction of the base is the problem.

Namely, the base comprised of resin has great coefficient of thermal expansion, so thermal contraction takes place in the cooling process of the injection molding and the peeling (separation) process from the stamper. As a result, multi-transfer (multiple transfer) of pits and/or deformation of pit shape would take place.

For example, as shown in FIG. 1, a base 1 comprised of resin attempts to undergo thermal contraction in the cooling process. At this time, because of the effect for preventing the flow of resin by pressure given by the metal mold or inversion pits 3 formed at a stamper 2 (which will be called anchor effect hereinafter), the resin is resultantly in the sticking state without moving on the stamper 2. However, when attempt is made to peel (separate) the base 1 from the stamper 2, its stress F is released. As a result, the base 1 contracts. In this instance, pit shape is deformed, from difference between contraction quantity at the sticking portion of the base 1 and that at the peeled (separated) portion thereof, at the boundary between the portion sticking on the stamper 2 and the peeled (separated) portion as shown in FIG. 2. As a result, transfer failure (or unsatisfactory transfer) would take place. Such pit deformation is apt to take place at pits adjacent to the long mirror portion in which the anchor effect by the inversion pits is difficult to obtain, e.g., at servo pits. Namely, the anchor effect by the inversion pits is difficult to obtain at the portion where the mirror portion is continued over a relatively longer distance such as the portion between the servo pit and the data pit. As a result, a portion of the base, i.e., resin moves on the stamper 2 by thermal contraction. Followed by this, the pit shape is deformed and/or pits are caused to undergo multi-transfer. Image by the AFM (Atomic Force Microscopy) indicating the state of deformation of pits is shown in FIG. 3. As is clear from FIG. 3, pits would be formed so as to take a trapezoidal shape.

As described above, because servo pits are used for tracking servo and are also used as a clock signal for the reproducing system, if their shapes are not correct, not only deviation in tracking takes place, but also deviation in the timing for generation of the clock signal takes place, with the result that bad influence is exerted on the reproducing system.

This invention has been proposed in view of such actual circumstances of the prior art, and its object is to provide an optical disc and an optical disc system in which various pits including servo pits can be formed in a satisfactory form, and tracking servo and/or generation of clock are precisely carried out.

DISCLOSURE OF THE INVENTION

An optical disc according to this invention comprises a base formed by resin, and a reflection layer formed on the base, wherein, on the base, servo areas where servo pits for providing servo information for sample servo system are formed at predetermined angular positions of the respective tracks, and data areas where data pits for providing data information accessed by an optical disc drive operative on the basis of the servo pits are formed between the respective servo areas, the servo area and the data area adjacent to each other including an anchor pit or pits neglected in the optical disc drive between the servo pit disposed at the position closest to the data area and the data pit disposed closest to the servo area.

In the optical disc according to this invention, e.g., the plural servo pits and the plural anchor pits are respectively formed so that they are radially continuous.

Moreover, in the optical disc according to this invention, e.g., the servo pits and the anchor pits are formed from the track of the inner circumferential end up to the track of the outer circumferential end.

Further, this invention is directed to an optical disc system comprising a first recordable/reproducible optical disc and a second reproduction only optical disc, wherein the first optical disc comprises a base formed by resin and a reflection layer formed on the base, and is such that, on the base, servo areas where servo pits for providing servo information for sample servo system are formed at predetermined angle positions of the respective tracks, data areas which can form data train for providing data information accessed by an optical disc drive operative on the basis of the servo pits are formed between the respective servo areas, and an area of mirror portion adapted for clamping a reproduction signal by the optical disc drive is formed between the servo and data areas adjacent to each other; and wherein the second optical disc comprises a base formed by resin and a reflection layer formed on the base, and is such that, on the base, servo areas where servo pits for providing servo information for sample servo system are formed at predetermined angular positions of the respective tracks, data areas where data pits for providing data information accessed by an optical disc drive operative on the basis of the servo pits are formed between the respective servo areas, areas corresponding to the respective mirror portions of the first optical disc being adapted to include therein an anchor pit or pits neglected in the optical disc drive.

BEST MODE FOR CARRYING OUT THE INVENTION

A preferred embodiment of this invention will now be described in detail with reference to the attached drawings. In the embodiment described below, this invention is applied to a reproduction only optical disc employing the sample servo system.

Figure 4:
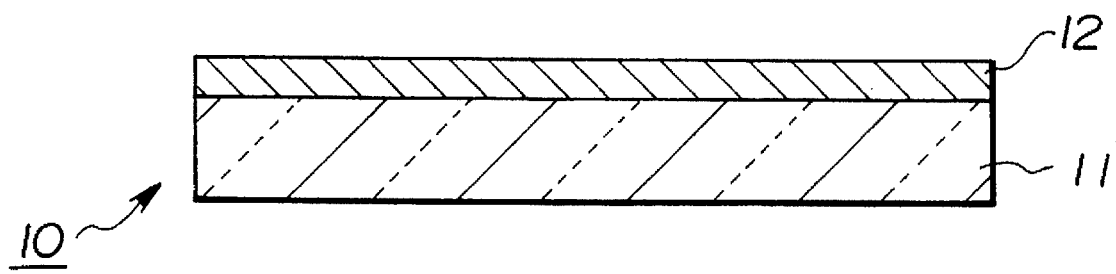
FIG. 4 is a cross sectional view showing outline of the essential part of an example of the configuration of an optical disc to which this invention is applied.

In the optical disc of this embodiment, as shown in FIG. 4, a reflection layer 12 is formed on a disc-shaped transparent base (substrate) 11 made up by injection-molding resin.

At the surface on the side where the reflection layer 12 is formed of the transparent base 11, data pits corresponding to information signals and servo pits for sample servo tracking are formed in a recessed form.

In the optical disc 10, respective tracks are divided into plural data areas, and two servo pits are respectively formed at servo areas between the respective adjacent two data areas.

Figure 5:
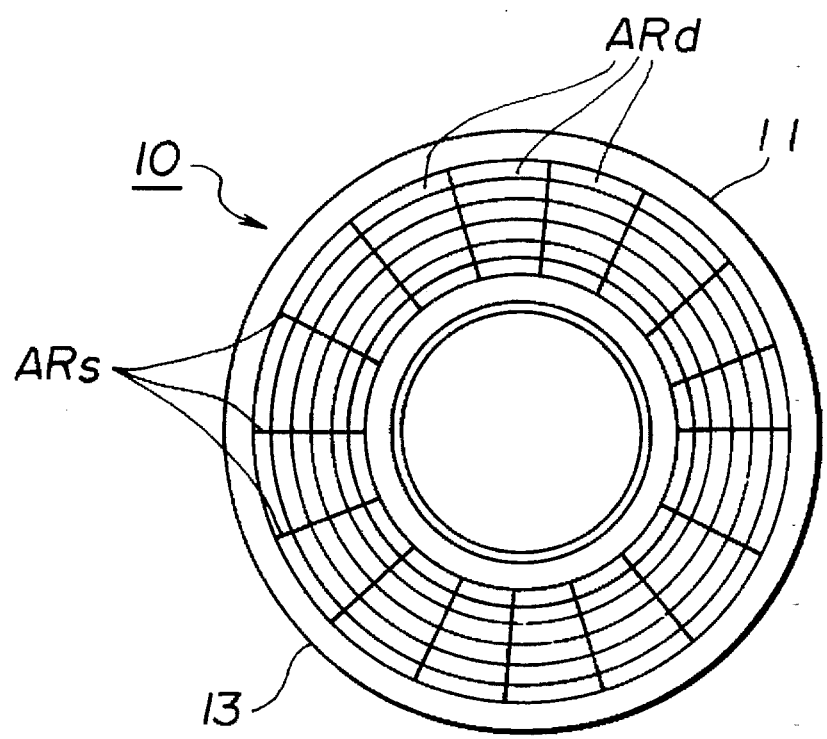
FIG. 5 is a plan view showing tracks set on transparent base of the optical disc.

Namely, tracks 13 in concentrical form or in spiral form are set on the transparent base 11 as shown in FIG. 5, wherein these tracks 13 are divided into plural data areas ARd, and servo areas ARs are respectively provided between the respective adjacent two data areas ARd.

Further, data pits are formed in the data areas ARd on the tracks 13. On the other hand, two servo pits are respectively formed in the servo areas ARs between the respective adjacent two data areas ARd. The servo area ARs where servo pits are formed is shown in a model form in FIG. 6.

Figure 6:
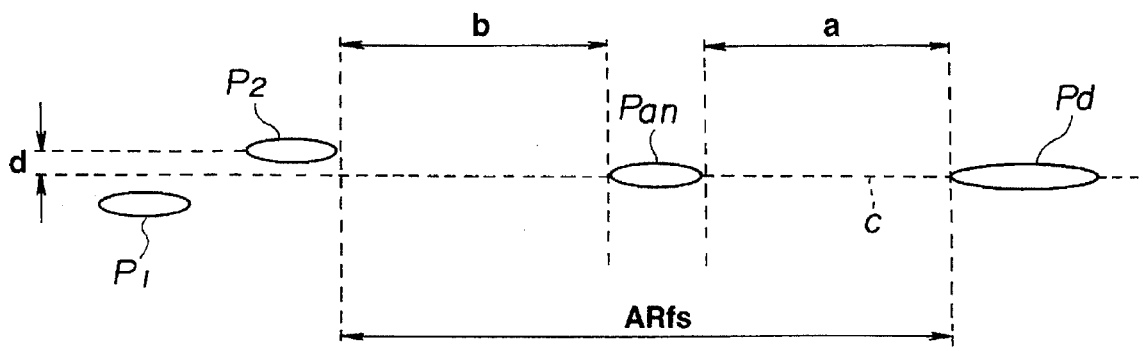
FIG. 6 is a model view showing data pit, servo pits and anchor pit formed on the transparent base of the optical disc.

As shown in the FIG. 6 mentioned above, a mirror portion RFfs extending by a predetermined distance from the first data pit Pd of the initial end side of the data area ARd is provided in the servo area ARs, and servo pits P1, P2 are formed so that distance d in a radial direction from the center line C becomes equal to ¼ track width by arrangement in wobble form such that the center line C of the track is put therebetween before and after.

Further, in the optical disc 10, pit Pan unnecessary for carrying out data access is formed between the servo pits P2 and the data pit Pd. In this example, such an unnecessary pit Pan is assumed to be called an anchor pit. This anchor pit Pan serves to prevent deformation of pits P2, Pd produced in the injection-molding of the transparent base 11.

It is to be noted that, in the optical disc 10 of this embodiment, respective servo areas ARs are disposed at positions obtained by equally dividing one round (circumference) of track, and servo pits P1, P2 and anchor pit Pan are radially arranged and formed.

Figure 7:
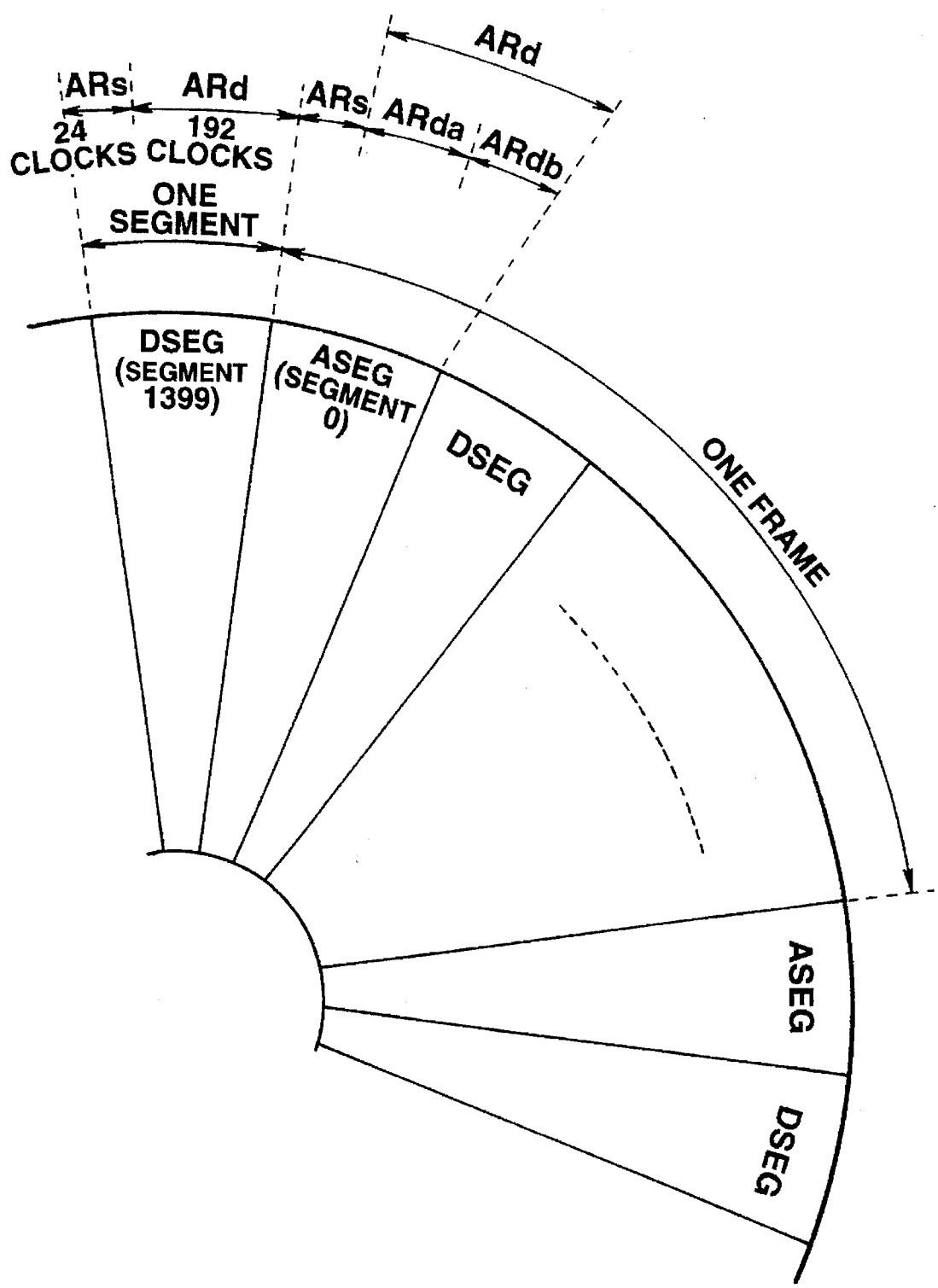
FIG. 7 is a plan view showing, in a model form, a more practical example of disc format of the optical disc.

In a more practical sense, as shown in FIG. 7, for example, this optical disc 10 is such that one round (circumference) of the track is divided into 1400 segments (segment 0~segment 1399), and those segments are classified into address segments ASEG and data segments DSEG.

On respective tracks of the address segments ASEG, position information in the radial direction on the disc, i.e., track numbers and position information in the tangential direction, i.e., segment numbers are recorded by pits in advance. Namely, pits are formed in advance at the time of preparation of the optical disc. These address segments ASEG exist every 14 segments and 100 address segments exist with respect to one round (circumference) of track. The portion from a certain address segment ASEG to the next address segment ASEG is one frame, and one round (circumference) of track consists of 100 frames. 13 segments between continuous two address segments ASEG serve as data segment DSEG. As the data segment DSEG, 1300 segments exist with respect to one round (circumference). Moreover, respective segments are constituted with areas corresponding to 216 servo clock pulses (hereinafter simply referred to as clocks depending upon circumstances), and consist of servo area ARs corresponding to 24 servo clocks and data area ARd corresponding to 192 servo clocks. At the address segment ASEG, the data area ARd consists of an address area ARda and a laser control area ARdb.

Figure 8:
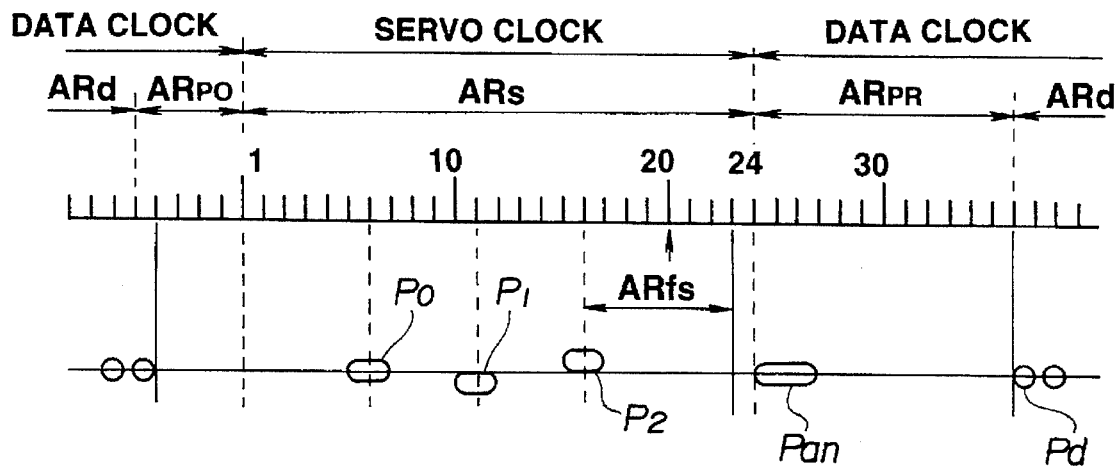
FIG. 8 is a model view in the vicinity of servo area showing arrangement state of data pits, servo pits and anchor pit in the more practical example.

Further, at the servo area ARs, as shown in FIG. 8, for example, three pits P0, P1, P2 respectively having lengths corresponding to two servo clock pulses are recorded in advance in the state where the centers therebetween are spaced by a length corresponding to five servo clock pulses, and a focus sample area ARfs having a length corresponding to six clock pulses is provided.

As stated above, by allowing pits P0, P1, P2 of the servo area ARs to respectively have a length corresponding to two servo clock pulses, the portion where no pit is formed, i.e., the area of mirror portions is reduced. Thus, ghost pit, etc. taking place at the time of disc molding can be difficult to take place. Further, since RF signals are stably reproduced from pits P1, P2, it becomes possible to stably generate various servo signals such as tracking servo signal, etc. on the basis of RF signals reproduced from pits P1, P2. Furthermore, the distances between centers of respective pits P0, P1, P2 are caused to be spaced by more than a predetermined distance, thereby permitting data interference between RF signals reproduced from respective pits P0, P1, P2 to be extremely reduced. In order to reduce such data interference between the pits, it is desirable to allow distances between respective pits P0, P1 and distances between respective pits P1, P2 to be spaced by more than five servo clock pulses.

The second pit P1 positioned for a 11~12 clock time period and the third pit P2 positioned for 16~17 clock time period are respectively wobble pits placed at positions shifted by ±¼ track width in the radial direction of the disc from the center of the track to provide tracking error information by the difference between the amplitude values of RF signals reproduced from these pits P1, P2. Moreover, as described later with reference to FIG. 13, phase information of servo clock is given by the difference between the amplitude values of both shoulder portions of the RF signals reproduced from these pits P1, P2 to further such phase information to thereby provide clock phase information which is not dependent upon the tracking state.

Further, the first pit P0 existing at the beginning of the servo area ARs is classified, in dependency upon its position, address mark indicating that corresponding segment is address segment ASEG, first sector mark indicating that corresponding segment is the leading segment of the sector, second sector mark indicating that the next segment is the leading segment of the sector, and segment mark in the case where the positional relationship of segment does not correspond to any cases described above.

Figure 1:
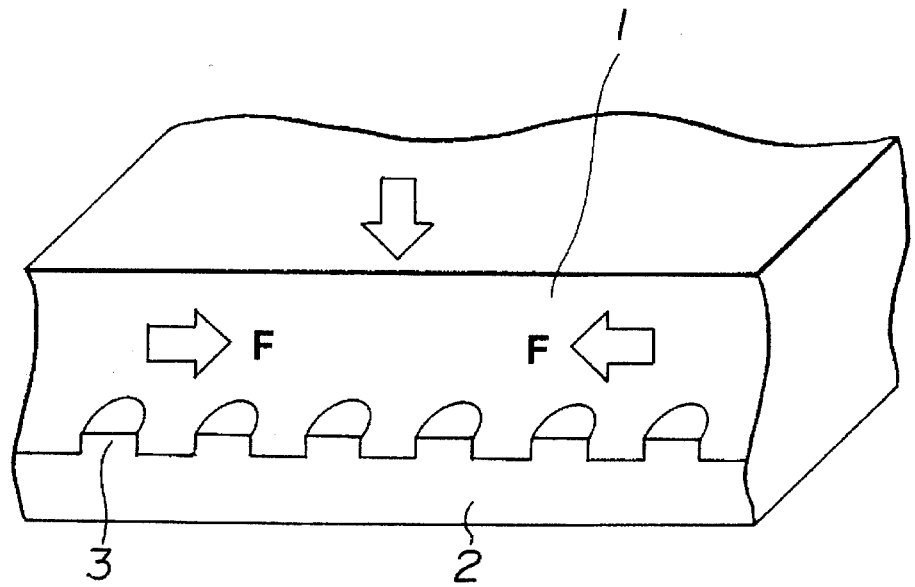
FIG. 1 is a model view showing the state of stamper and base in the cooling process of a conventional injection molding.
Figure 2:
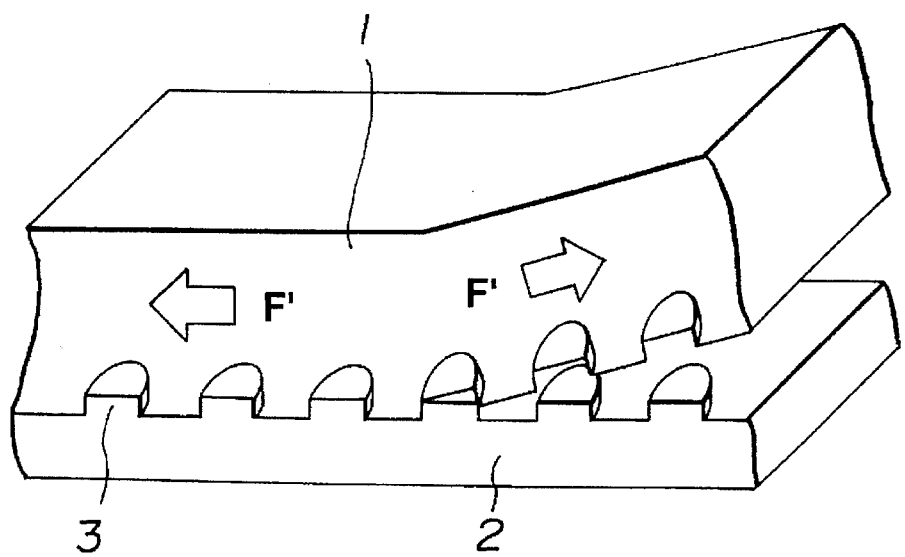
FIG. 2 is a model view showing the state of the stamper and the base in the base peeling process of the injection molding.
Figure 3:
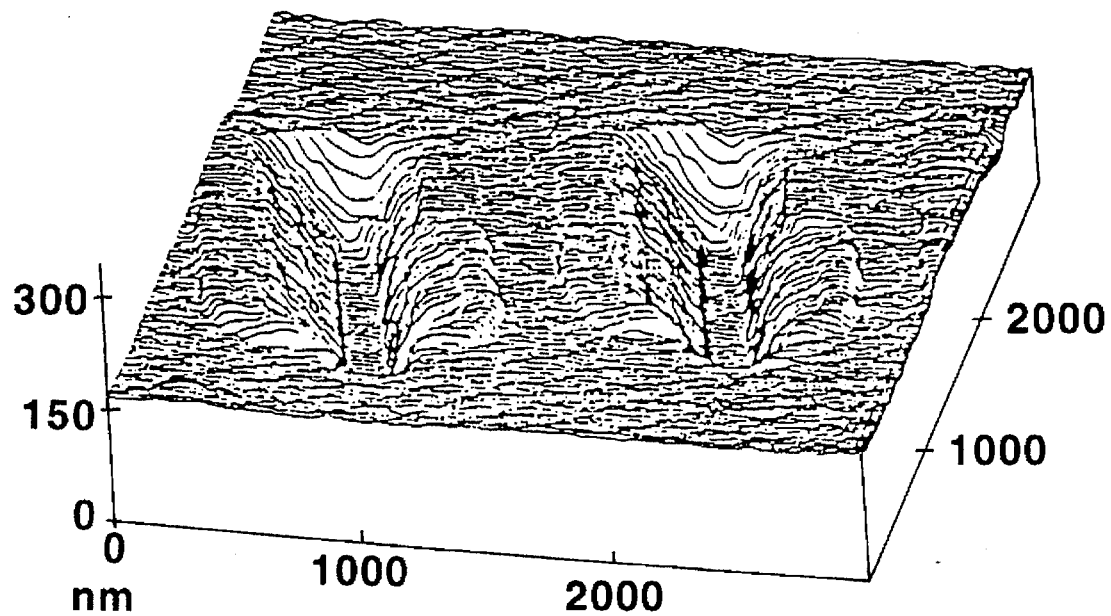
FIG. 3 is a model view in which shape of pits deformed in the injection molding is depicted on the basis of measurement result by AFM.

The first pit P0 becomes address mark in the case where it is located for 3~4 clock time period, first sector mark in the case where it is located for 4~5 clock time period, and second sector mark in the case where it is located for 5~6 clock time period. It is to be noted that start positions of respective sectors will be described later with reference to FIG. 13. Information indicated by the first pit P0 can be discriminated by examining the position where reproduced RF signal takes the maximum amplitude value by the difference maximum detection so called differential detection method as shown in FIG. 3, for example.

Since information indicating address mark or first sector mark and second sector mark is or are given by the first pit P0 existing at the beginning of the servo area ARs in a manner stated above, it is unnecessary to record sector number or track address in units of sector.

Further, in the optical disc 10, anchor pit Pan having the area corresponding to three data clock pulses is provided at the leading portion of the data area ARd. By providing such anchor pit Pan in this way, the area of the mirror portions is reduced. Thus, bad influence exerted on servo pit at the time of disc molding is lessened.

Figure 9:
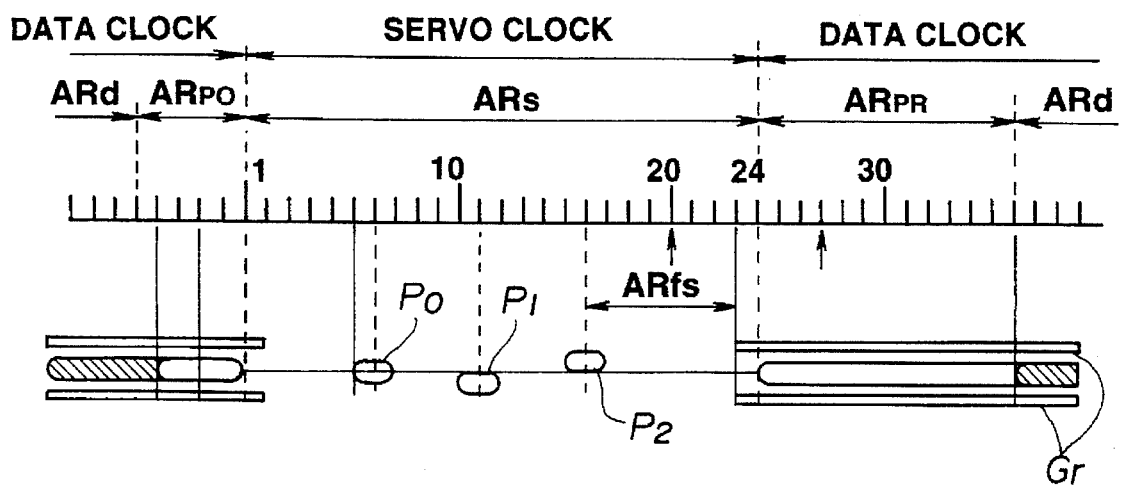
FIG. 9 is a model view in the vicinity of servo area of a magneto-optical disc employing the disc format of the more practical example.

In addition, pre-write area $AR_{PR}$ for ensuring compatibility with a magneto-optical disc shown in FIG. 9 is provided at the leading portion of the data area ARd. This pre-write area $AR_{PR}$ is an unnecessary area in the reproduction only so called ROM disc.

It is a to be noted that while this optical disc 10 is reproduction only so called ROM disc, this disc format can be applied to recordable optical discs such as magneto-optical (MO) disc, etc.

Namely, in the recordable optical disc such as magneto-optical (MO) disc, etc., grooves Gr are provided, as shown in FIG. 9, at the portion corresponding to the data area ARd without provision of the anchor pit Pan to thereby reduce the area of the mirror portions to lessen bad influence in the disc molding on the servo pit. Since the groove Gr is not used for the tracking control, accuracy such as depth, etc. is not required. In this example, data area ARd of the data segment DSEG consists of data area ARd corresponding to 176~368 data clock pulses for recording ordinary data, pre-write area $AR_{PR}$ corresponding to 12 data clock pulses, and post-write area $AR_{PO}$ corresponding 4 data clock pulses. The pre-write area $AR_{PR}$ is provided for ensuring a distance necessary for pre-heating until the disc takes a stable temperature with respect to data recording from the time when the drive unit starts irradiation of laser and for use as a clamp area for suppressing DC fluctuation (change) resulting from birefringence, etc. of signal at the time of reproduction. Moreover, the post-write area $AR_{PO}$ is provided for eliminating erasing remainder of data recorded at the overwrite time, and for ensuring distance sufficient to avoid data interference taking place by the edge of the groove. Such optical discs are bulk-erased at the time of shipping. Further, data having the same polarity as that in the bulk erase direction is recorded with respect to the pre-write area $AR_{PR}$, whereby even if data is not normally recorded into the pre-write area $AR_{PR}$ by insufficient pre-heating of the media, value of the data recorded on the optical disc is not changed. Accordingly, it is possible to reproduce a stable signal.

In the reproduction only optical disc 10 of this embodiment, the pre-write area $AR_{PR}$ corresponding to 12 clock pulses is not required. However, since the format is caused to be common to the recordable optical disc, mirror portion corresponding to 19 clock pulses would be formed by the focus sample area ARfs having a length corresponding to 7 clock pulses and the pre-write area $AR_{PR}$ corresponding to 12 clock pulses. Accordingly, anchor pit Pan having the area corresponding to three clock pulses is provided at the leading portion of the data area ARd to reduce the mirror portion, thus to lessen bad influence exerted on the servo pit at the time of disc molding.

Figure 10:
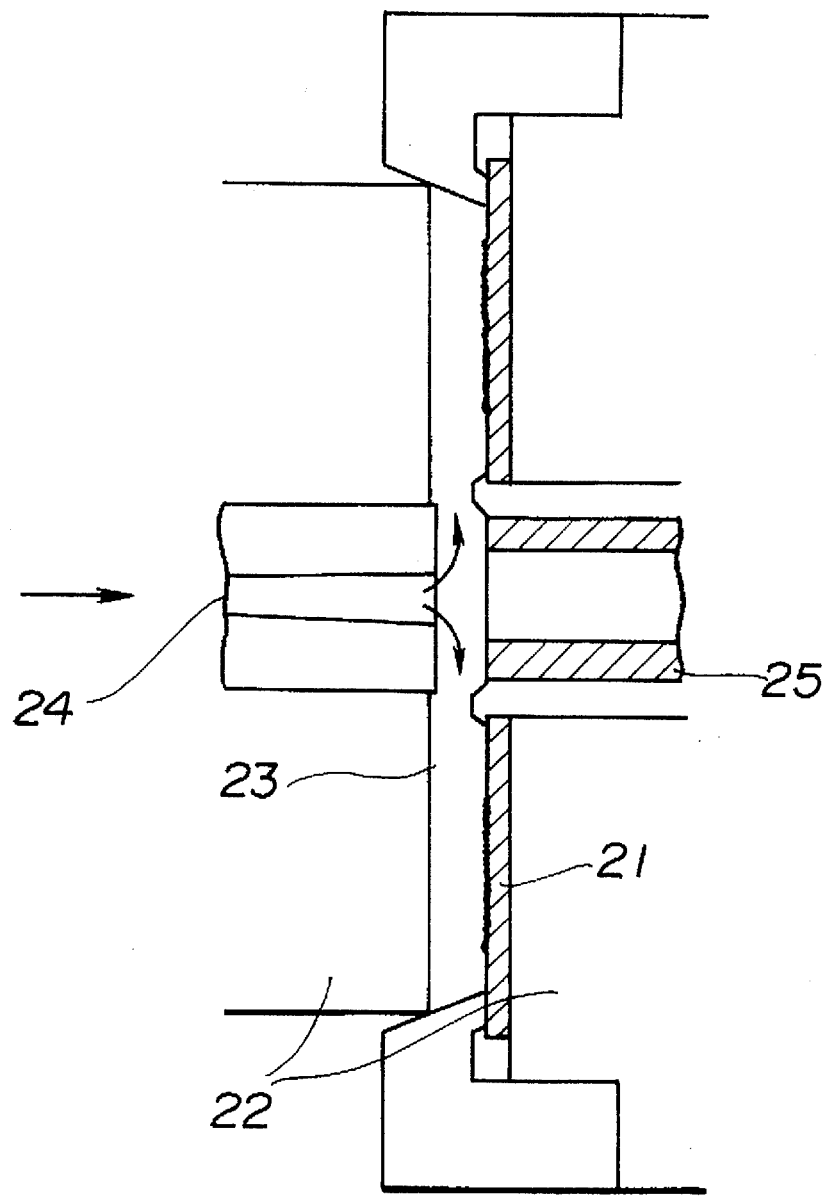
FIG. 10 is a cross sectional view showing outline of the essential part of the configuration of the principle of injection molder for preparing transparent base of the optical disc.

The transparent base 11 of the optical disc 10 of such a structure will be described in a manner as described below by an injection molder of a structure as shown in FIG. 10, for example.

Namely, a stamper 21 where inversion pattern of the servo pits P0, P1, P2, the anchor pit Pan and the data pit Pd described above is formed is disposed within a disc-shaped cavity 23 formed by a metal mold 22. Then, molten resin such as polycarbonate, etc. is injected from a resin injection hole 24 into the cavity 23 of the metal mold 22 molded-clamped in this state. Then, pressure is applied to the metal mold 22 while cooling it, whereby shape of the stamper 21 is transferred onto the resin. After the resin is solidified, the metal mold 22 is opened to peel off the solidified resin from the stamper 21 by protrusion of an ejector 25. Thus, transparent base 11 for optical disc is obtained.

In preparing the base 11 for optical disc by the injection-molding, since the resin has a large coefficient of thermal expansion, it attempts to undergo thermal contraction when peeling it in the cooling process and peeling from the stamper 21, movement of the base 1, i.e., the resin relative to the stamper 21 is suppressed by the anchor effect by the inversion pits at the portion where a large number of inversion pits are formed at the stamper 21.

Namely, in the injection-molding of the base 11 having anchor pit Pan at the mirror portion ARfs between servo pit P2 and data pit Pd, since stamper 21 in which inversion pattern of anchor pit Pan is formed in addition to the inversion pattern of data pit Pd and servo pits P0, P1, P2 is used, movement of the resin relative to the stamper 21 by thermal contraction is suppressed by the inversion pattern of the anchor pit Pan. Thus, deformation of data pit Pd and/or servo pit P2 existing in the vicinity thereof is prevented. As a result, various pits including servo pits P0, P1, P2 are formed in a satisfactory shape like an AFM (Atomic Force Microscopy) image of FIG. 11.

Figure 12:
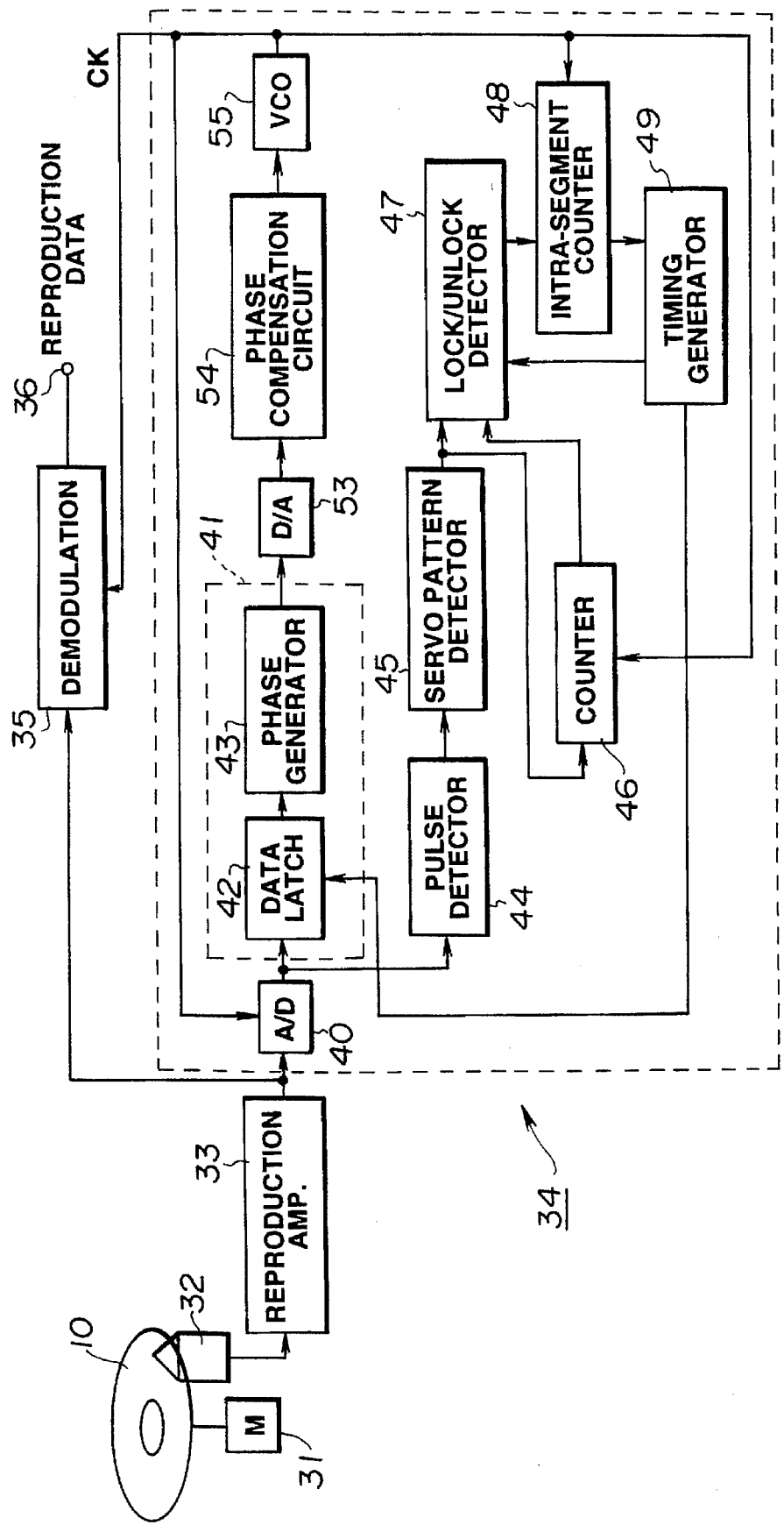
FIG. 12 is a block diagram showing the configuration of an optical disc reproducing unit for reproducing the optical disc.

As an optical disc reproducing apparatus for reproducing the optical disc 10, there are apparatus as disclosed in the Japanese Patent Application No. 185323/1993 or the Japanese Patent Application No. 30976/1993 that the applicant of this application has already filed. Outline of the optical disc reproducing apparatus will now be described with reference to the block diagram shown in FIG. 12.

This optical disc reproducing unit (apparatus) comprises a spindle motor 31 for rotationally driving the optical disc 10 at a constant angular velocity, an optical pick-up 32 for scanning the optical disc 1 by laser beams, a reproduction amplifier 33 for amplifying a reproduction signal corresponding to the presence or absence of pit from the optical pick-up 33 to form a RF signal to output it, a channel clock forming section 34 for generating a channel clock CK on the basis of the RF signal delivered from the reproduction amplifier 33, a demodulating section 35 operative on the basis of the channel clock CK delivered from the channel clock forming section 34.

The channel clock forming section 34 has a configuration of a so called PLL (Phase Locked Loop) circuit, and includes, in a more practical sense, an A/D converter 40 for sampling the RF signal from the reproduction amplifier 33 by channel clock CK to digitize it to form pit data to output it, a phase data forming circuit 41 for detecting error of phase of channel clock CK with respect to servo pit data on the basis of the pit data from the A/D converter 40 to output phase error detection data, a pulse detector 44 for forming servo data from the pit data from the A/D converter 40 to output it, and a servo pattern detector 45 in which servo pit pattern is stored in advance, the servo pattern detector 45 being operative to detect data equal to servo pit pattern from the servo data on the basis of the servo pit pattern.

More particularly, the phase data forming circuit 41 is composed of a data latch circuit 42 for latching the pit data by a timing pulse from the timing generator 49, and a phase generator 43 for performing a predetermined operation on the basis of the pit data latched by the data latch circuit 42 to detect phase error between the pit data and channel clock CK.

Moreover, the channel clock forming section 34 includes a counter 46 reset with the servo pattern detection pulse from the servo pattern detector 45 being a as trigger pulse to count, by a predetermined number, the channel clock CK to thereby form a first window pulse for detecting servo pit pattern of the next segment to output it, and a lock/unlock detecting circuit 47 for detecting at the timing of the first window pulse from the counter 46 or a second window pulse from the timing generator 49 whether or not the servo pattern detection pulse is delivered to thereby detect whether or not lock of the phase between the channel clock CK and the servo data has been carried out.

Further, the channel clock forming section 34 includes an intra-segment counter 48 reset by detection data generated in the case where data equal to the servo pit pattern is detected within a window indicated by the first window pulse in the lock/unlock detecting circuit 47 to start a count operation of the channel clock CK, and the timing generator 49 operative so that when count value from the intra-segment counter 48 becomes equal to a predetermined value, it forms the second window pulse to deliver it to the lock/unlock detecting circuit 47, and to form a latch pulse in dependency upon the count value and; to deliver it to the data latch circuit 42.

In addition, the channel clock forming section 34 includes a D/A converter 53 for converting phase error detection data from the phase generator 43 into data in analog form to output it, a phase compensation circuit 54 comprised of, e.g., a low-pass filter which compensates phase of the phase error detection signal from the D/A converter 53 to output it, and a voltage controlled oscillator (VCO) for forming channel clock CK of which frequency is varied on the basis of the phase error detection signal from the phase compensating circuit 54 to deliver it to the demodulating circuit 35.

In the optical disc reproducing apparatus, the channel clock forming section 34 carries out adjustment for matching between phase of the servo data and phase of the channel clock CK prior to actual reproducing operation.

Initially, the optical pick-up 32 irradiates weak laser beams for reproduction onto the optical disc 10 rotationally driven at constant angular velocity by the spindle motor 31 to detect its return light. Then, the optical pick-up 32 allows the return light to undergo photoelectric conversion to thereby reproduce information recorded on the optical disc 10 to deliver a reproduction signal to the reproduction amplifier 33.

The reproduction amplifier 33 amplifies the reproduction signal at a predetermined gain to deliver it as RF signal to the A/D converter 40 of the channel clock forming section 34. The A/D converter 40 is supplied with channel clock CK of free-running frequency from the voltage controlled oscillator (VCO) 55 in which oscillating frequency is varied in dependency upon a voltage delivered thereto. The A/D converter 40 samples the RF signal by the channel clock CK to digitize it to form pit data to deliver it to the data latch circuit 42 and the pulse detector 44.

The pulse detector 44 determines the differential value of the pit data to thereby detect pit data which serves as point of inflection from plus to minus of a waveform of pit data indicated in analog form of the pit data to form a data train in which value of detected data is caused to be "1" and values of other pit data are caused to be "0". Then, the pulse detector 44 delivers servo data consisting of the data train to the servo pattern detector 45.

In the servo pattern detector 45, servo pit pattern data which is the same pattern as the servo pit pattern formed on the optical disc 10 is stored in advance. The servo pattern detector 45 compares the servo pit pattern data stored in advance and the servo data, whereby when the servo data becomes in correspondence with the servo pit pattern data, it delivers a servo pattern detection pulse to the counter 46 and the lock/unlock detecting circuit 47.

The counter 46 is supplied with channel clock CK from the VOC 55, and is operative to reset the count value with the servo pattern detection pulse being the as trigger pulse. Then, the counter 46 newly counts the channel clock CK from the reset timing.

In this case, if the channel clock CK outputted from the VOC 35 has correct phase, the reproduction time of one segment, i.e., the time (period) from the time when the servo pattern detection pulse is delivered to the lock/unlock detecting circuit 47 up to the time when the servo pattern detection pulse is subsequently delivered is, e.g., the time of 296 channel clock pulses. From the facts described above, the counter 46 predicts, by the count value thereof, timing at which the Servo pattern detection pulse is subsequently delivered to the lock/unlock detecting circuit 47 to form first window pulse when the count value becomes equal to 296, which is the above predicted timing, thus to deliver it to the lock/unlock detecting circuit 47.

The lock/unlock detecting circuit 47 is operative so that in the case where the servo pattern detection pulse is delivered when the first window pulse is delivered, it delivers detection pulse to the intra-segment counter 48.

The intra-segment counter 48 is supplied with the channel clock CK from the VOC 55 similarly to the counter 46 to reset the count value thereof with the detection pulse from the lock/unlock detecting circuit 47 being as trigger pulse. Then, the intra-segment counter 48 newly counts the channel clock CK from the reset timing to deliver this count value to the timing generator 49.

The timing generator 49 forms latch pulses which are respectively caused to be at a high level at timings of sampling points of both shoulders away in point of time by one channel clock (pulse) before and after from the center points of the respective reproduction waveforms with respect to servo pits P1, P2 on the basis of the count value delivered from the intro-segment counter 48 to deliver these latch pulses to the data latch circuit 42.

Figure 13:
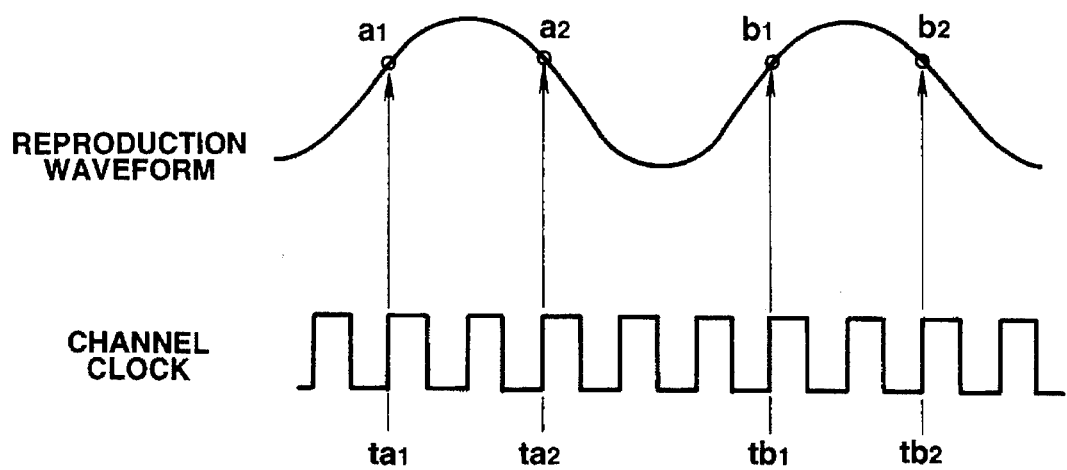
FIG. 13 is a timing chart showing sampling timing of servo pit pattern in the optical disc reproducing unit.

The data latch circuit 42 latches, as shown in FIG. 13, pit data from the A/D converter 20 at timings $t_{a1}$, $t_{a2}$, $t_{b1}$, $t_{b2}$ of the latch pulse delivered from the timing generator 49 to thereby latch, from reproduction waveform of the servo pit pattern, sampling data a1, a2 at sampling points of both shoulders away in point of time by one channel clock before and after from the center point of the reproduction waveform with respect to the servo pit p1 and sampling data b1, b2 at sampling points of both shoulders away in point of time by one channel clock before and after from the center points of reproduction waveform with respect to servo pit P2. Then, data latch circuit 42 delivers respective latch outputs to the phase generator 43.

The phase generator 43 detects phase error between the channel clock CK and servo data by the operation expressed below $$\text{phase error data} = [(a2-a1)+(b2-b1)]/2$$

from sampling data a1, a2 at sampling points of both shoulders away in point of time by one channel clock before and after from the center point of reproduction waveform with respect to the servo pit P1 and sampling data b1, b2 at sampling points of both shoulders away in point of time by one channel clock before and after from the center points of reproduction waveform with respect to servo pit P2 by making use of symmetry in left and right directions of reproduction waveform of the servo pit pattern to deliver it as phase error detection data to the D/A converter 53.

Moreover, the timing generator 49 predicts, by the count value from the intra-segment counter 28, timing at which the servo pattern detection pulse is to be subsequently delivered to the lock/unlock detecting circuit 47 to deliver second window pulse to the lock/unlock detecting circuit 47, e.g., when the count value becomes equal to 296, which is the predicted timing.

The lock/unlock detecting circuit 47 detects whether or not the servo pattern detection pulse falls within the second window pulse to thereby discriminate whether or not lock of phase between the channel clock CK and servo data has been carried out.

It is to be noted that since the servo pit pattern is not a unique pattern, there are instances where it may be in correspondence with the pattern of servo data obtained from information recorded at the data portion. For this reason, if only the counter 46 is provided, since the counter 46 is reset even in the case where the servo pattern detector 45 erroneously detects the pattern of servo data as servo pattern, the first window pulse outputted from the counter 46 would be outputted at an erroneous timing. Accordingly, it becomes impossible to carry out phase lock of channel clock CK with respect to the RF signal.

However, in this channel clock forming section 34, there is provided intra-segment counter 48 reset when the servo pattern detection pulses are continuously delivered twice within the timing of the initially delivered first window pulse and the subsequently delivered first window pulse to detect the servo pattern detection pulse at the timing of the second window pulse formed when the intra-segment counter 48 takes a predetermined count value. For this reason, even if the servo pattern is not the unique pattern, it is possible to precisely carry out detection of servo pit pattern.

Accordingly, it is possible to deliver the latch pulse at the timing where the data latch circuit 42 can precisely latch the servo pit pattern.

The D/A converter 53 converts the phase error detection data into data in analog form to thereby form a phase error detection signal to deliver it to the VCO 55 through the phase compensating circuit 54.

The VOC 55 varies frequency of the channel clock CK outputted in dependency upon the phase error detection signal to feed the frequency varied channel clock CK back to the A/D converter 20, and to deliver it to the counter 46 and the intra-segment counter 48.

The optical disc reproducing unit (apparatus) is placed in a stand-by (waiting) state when lock of the phase of the channel clock CK with respect to the RF signal is established.

When reproduction of information is designated (instructed) in the stand-by state, the optical disc reproducing unit delivers a reproduction signal by the optical pick-up 32 to the demodulating circuit 35 as RF signal through the reproduction amplifier 33.

The demodulating circuit 35 is supplied with the phase-locked channel clock CK from the VOC 35 to demodulate reproduction data from the RF signal on the basis of the channel clock CK to output the reproduction data through output terminal 36.

As is clear from the foregoing description, in the optical disc reproducing apparatus of the sample servo system, since it is possible to grasp (recognize), at all times, the position on the optical disc that the laser spot scans after the phase is locked, even if excess anchor pit is provided, it is possible to reproduce data without any problem.

Figure 11:
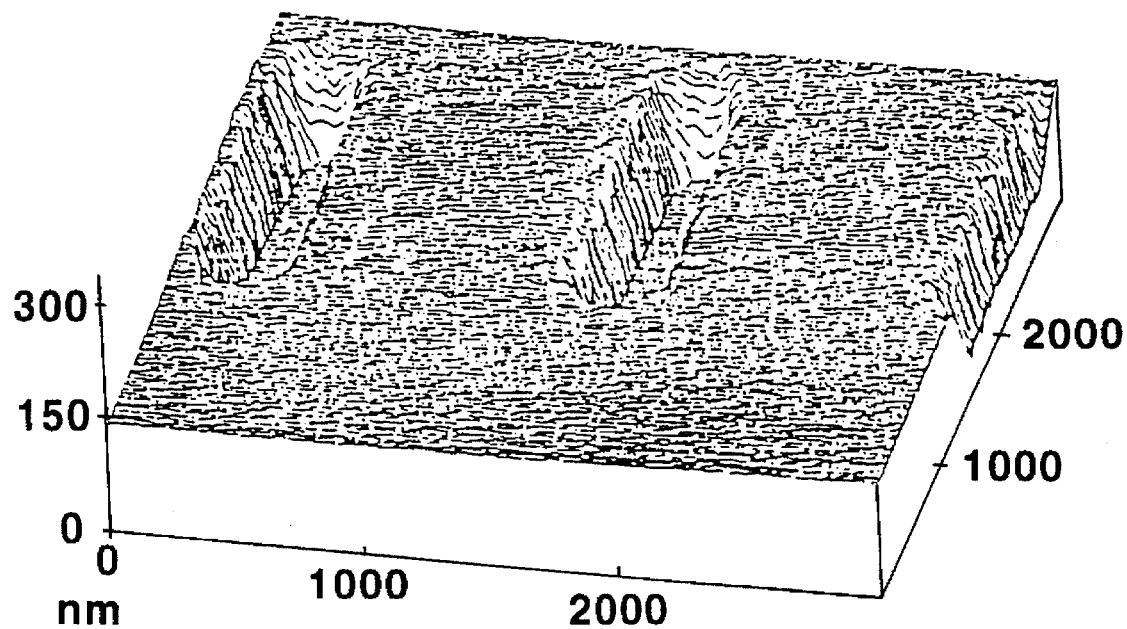
FIG. 11 is a model view in which shape of pits where deformation is suppressed by the anchor effect in the injection molding is depicted on the basis of measurement result by AFM.

In order that various pits including the servo pits P1, P2 are formed in a satisfactory form like AFM image as shown in FIG. 11 mentioned above, the (time) interval a between the data pit Pd and the anchor pit Pan and the (time) interval b between the anchor pit Pan and the servo pit P2 are important. If such (time) interval is too great, sufficient anchor effect cannot be obtained in the injection molding of the base as in the case of the prior art, giving rise to deformation of the pit.

Figure 14:
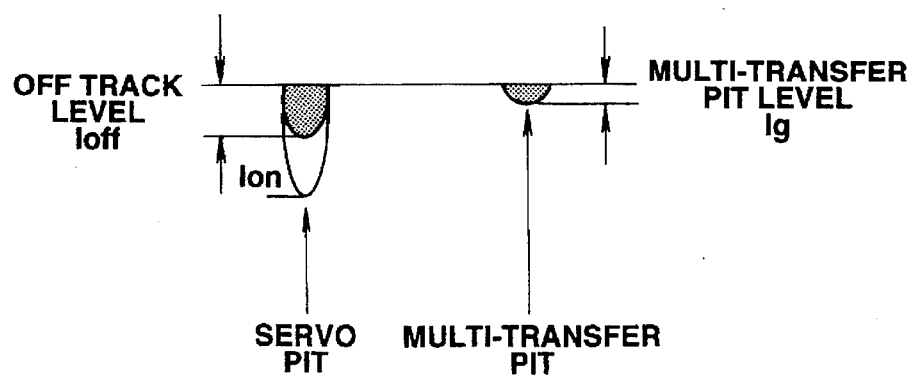
FIG. 14 is a waveform diagram for explaining the relationship between $I_g$ and $I_{off}$.
Figure 15:
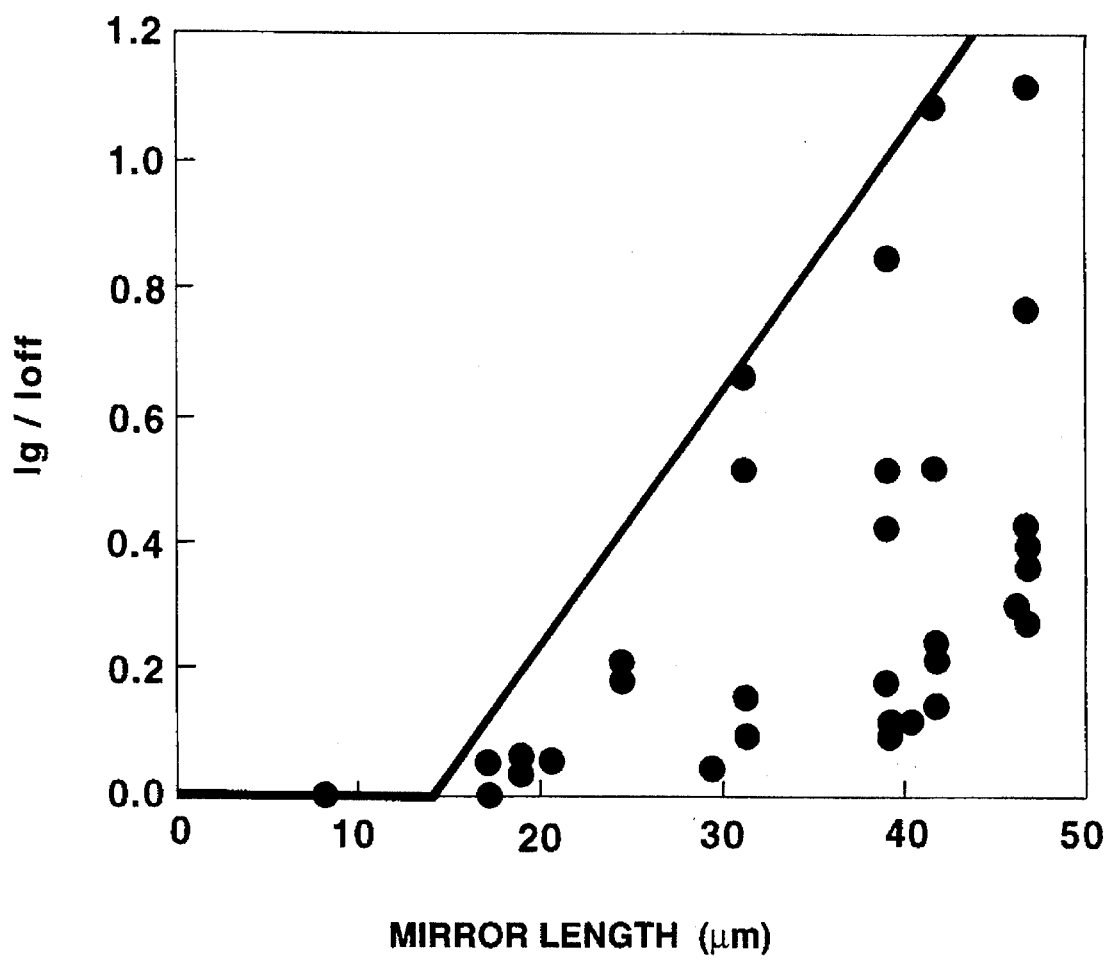
FIG. 15 is a characteristic diagram showing the relationship between mirror length and $I_g/I_{off}$.

In the optical disc reproducing apparatus, with respect to signal level (current value) of RF signal outputted through the reproduction amplifier 33 from the optical pick-up 32, as shown in FIG. 14, the signal level of RF signal reproduced from servo pits in the state caused to undergo off-track by ¼ track width from the so-called just track state is assumed to be off track level $I_{off}$, the signal level of RF signal reproduced from servo pits in the just track state is caused to be track level $I_{on}$, and the maximum value of the signal level of RF signal reproduced multi-transfer pits is assumed to be multi-transfer pit level $I_g$. Under such condition, respective samples in which the length of the mirror section of the servo area is varied without provision of anchor pit Pan are prepared to measure the off track level $I_{off}$, the on track level $I_{on}$ and the multi-transfer pit level $I_g$ to determine the relationship between the length of the mirror portion and $I_g/I_{off}$. Thus, result as shown in FIG. 15 is obtained. In FIG. 15, the respective black circles ● represent measured results of respective samples.

Namely, between the length of the mirror portion and $I_g/I_{off}$ (according as $I_g/I_{off}$ becomes greater, tracking error is apt to take place), there exists a correlation as shown in FIG. 15 such that when the length of the mirror portion is above 13 μm, $I_g/I_{off}$ is increased to more of a degree. Thus, it is seen that as the length of the mirror portion becomes greater, multi-transfer pits are apt to take place to more of a degree. When the length of the mirror portion is less than 13 μm, multi-transfer hardly takes place. From the facts described above, it is preferable that the (time) interval between the data pit Pd and anchor pit Pan and the anchor pit Pan and the servo pit P2 are both set to less than 13 μm.

As material of such transparent base, there may be employed ordinary resin used in the injection molded base in the optical disc, e.g., acrylic resin, polycarbonate resin, polyolefine or epoxy resin, etc.

Moreover, as reflection layer formed on the transparent base, high reflection factor film ordinarily used in the reproduction only optical disc, such as, for example, aluminum thin film, etc. may be employed.

Since optical disc of such a configuration is of a structure in which various pits are formed in a satisfactory form on the transparent base, the tracking control and/or generation of clock are precisely carried out. Thus, satisfactory reproduction characteristic can be obtained.

It is to be noted that while the above-described optical disc is of a structure in which one anchor pit is formed between the data pit and the servo pit on the transparent base so that mirror portion between the data pit and the servo pit is not continuous, a plurality of anchor pits may be formed without being limited to a single anchor pit.

In addition, while explanation has been given in this embodiment by taking the example of the reproduction only optical disc, this invention is not limited to such optical disc. If the sample servo system is employed, this invention may be applied to a rewritable optical disc such as magneto-optical disc, etc. or write-once type optical disc. Also in this case, similar effects/advantages are exhibited.

Anchor pit Pan is provided at the mirror portion ARfs between the data pit Pd and the servo pit P2 as in the case of the optical disc 10 of this embodiment to thereby reduce the area of the mirror portions ARfs, thus making it possible to lessen bad influence exerted on the servo pits at the time of disc molding.

What is claimed is:

1. An optical disc for use with an optical disc drive comprising, a base formed of resin;

a reflection layer formed on the base;

a plurality of servo areas on the base where a plurality of servo pits for providing servo information for a sample servo system are formed at predetermined angular positions in a plurality of respective tracks;

a plurality of data areas where a plurality of data pits for providing data information accessed by the optical disc drive operative on the basis of the servo pits are formed between the respective servo areas, and wherein the servo area and the data area are adjacent to each other and include a plurality of anchor pits neglected by the optical disc drive between the servo pit disposed at the position closest to the data area and the data pit disposed closest to the servo area.

2. The optical disc as set forth in claim 1, wherein the plurality of servo pits and the plurality of anchor pits are respectively formed so that they are radially continuous.

3. The optical disc as set forth in claim 2,
wherein the servo pits and the anchor pits are formed from a track of the linear circumferential end up to a track of the outer circumferential end of the base.

4. An optical disc system comprising, a first recordable/reproducible optical disc;

a second reproduction only optical disc, wherein the first optical disc comprises a base formed of resin and a reflection layer formed on the base, and formed on the base are a plurality of servo areas where a plurality of servo pits for providing servo information for a sample servo system are formed at a predetermined angle position in a plurality of respective tracks, forming a data train for providing data information accessed by an optical disc drive of the optical disc system operative on the basis of the servo pits between the respective servo areas, and an area of a mirror portion adapted for clamping a reproduction signal by the optical disc drive formed between the servo and data areas adjacent to each other, and wherein the second optical disc comprises a base formed of resin and a reflection layer formed on the base, and formed on the base are a plurality of servo areas where a plurality of servo pits for providing servo information for a sample servo system are formed at predetermined angular positions in a plurality of respective tracks, and further comprising a plurality of data areas where a plurality of data pits for providing data information accessed by an optical disc drive of the optical disc system operative on the basis of the servo pits are formed between the respective servo areas, the areas corresponding to the respective mirror portions of the first optical disc being adapted to include therein a plurality of anchor pits neglected by the optical disk drive.

* * * * *